United States Patent
Ichikawa et al.

(10) Patent No.: US 7,056,052 B2
(45) Date of Patent: Jun. 6, 2006

(54) INK RESERVOIR FOR WRITING INSTRUMENT

(75) Inventors: Shuji Ichikawa, Yokohama (JP); Kazuhiko Furukawa, Yokohama (JP); Takeshi Kobayashi, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 10/513,039

(22) PCT Filed: May 1, 2003

(86) PCT No.: PCT/JP03/05580

§ 371 (c)(1),
(2), (4) Date: Nov. 1, 2004

(87) PCT Pub. No.: WO03/093028

PCT Pub. Date: Nov. 13, 2003

(65) Prior Publication Data

US 2005/0169694 A1 Aug. 4, 2005

(30) Foreign Application Priority Data

May 1, 2002 (JP) ............................... 2002-129885
May 31, 2002 (JP) ............................... 2002-160164

(51) Int. Cl.
 *B43K 5/02* (2006.01)
 *B43K 7/08* (2006.01)
(52) U.S. Cl. ...................... 401/222; 401/141; 401/142

(58) Field of Classification Search ................ 401/208, 401/209, 221, 222, 141, 142
See application file for complete search history.

(56) References Cited

U.S. PATENT DOCUMENTS 6,742,952 B1 * 6/2004 Chen et al. ................ 401/192

FOREIGN PATENT DOCUMENTS

| JP | 9-141180 A    | 6/1997  |
|----|---------------|---------|
| JP | 10-119478 A   | 5/1998  |
| JP | 11-342694 A   | 12/1999 |
| JP | 2000-326683 A | 11/2000 |
| JP | 2001-146090 A | 5/2001  |
| JP | 2001-314803 A | 11/2001 |
| JP | 2002-307890 A | 10/2002 |

* cited by examiner

*Primary Examiner*—David J. Walczak
(74) *Attorney, Agent, or Firm*—Buchanan Ingersoll PC (57) ABSTRACT

In order to provide an ink reservoir for a writing instrument which has satisfactory permeation resistance and moisture-absorption resistance against permeation of a solvent and absorption of moisture and which is excellent in a storing property of the ink with the passage of time, an ink reservoir for a writing instrument in which an ink for a writing instrument is stored is constituted of at least one selected from the group consisting of a cyclic olefin resin, a fluorine base resin and a high molecular weight olefin resin or the ink reservoir for a writing instrument described above is constituted of a laminated structure which is formed by extrusion molding of two or more kinds of thermoplastic resins.

12 Claims, 3 Drawing Sheets

INK RESERVOIR FOR WRITING INSTRUMENT

TECHNICAL FIELD

The present invention relates to an ink reservoir for a writing instrument which is suitably used as an ink reservoir for a writing instrument such as an ink reservoir for a ballpoint pen and which is excellent in a storing property of the ink with the passage of time.

BACKGROUND ART

Usually, linear olefin resins such as polypropylene and polyethylene have so far been used for an ink reservoir for a writing instrument, and a polypropylene-made ink reservoir is used as an ink reservoir also for a ballpoint pen using an oil-base ink.

This is because of the reasons that a large amount of an ink is filled into an ink reservoir in a felt-tip pen using an oil-base ink and a solvent having low volatility of a vapor pressure of 0.1 mm Hg or less and low hygroscopicity is used as a solvent for a conventional oil-base ink for a ballpoint pen, so that volatilization of the solvent and absorption of moisture are not specifically regarded as problems and that it is not meaningful to change a polypropylene-made ink reservoir having a merit in terms of a cost.

On the other hand, an amide base resin for a gas barrier for preventing oxygen, carbon dioxide and moisture from coming in from the outside and polyethylene or polypropylene for preventing moisture from penetrating into the above resin are used for a laminate reservoir having a conventional laminated structure.

Usually, the above amide base resin for a gas barrier and resins such as polyethylene and polypropylene are not compatible between the polymers themselves, and therefore in general, both resins have so far been stuck together by providing an adhesive layer. The existing situation is that no methods other than the above method are available excluding a method in which a metal tube is used.

On the other hand, the present inventors have developed an ink for a writing instrument in which a solvent selected from the group consisting of alcohols having 4 or more carbon atoms in a molecule, polyhydric alcohols and glycol monoethers is used as a principal solvent for the ink and which is excellent in a writing performance and a drying property of the drawn lines and causes no strike-through.

However, when a polypropylene-made ink reservoir is charged with an ink containing the above solvent, a problem is brought about in that it is unsatisfactory for permeability of the solvent and absorption of moisture and inferior in a storing property of the ink with the passage of time.

Further, inks for a writing instrument including an oil-base ink and a water-base ink each having a composition in which various solvents are combined have been developed in recent years, and an ink reservoir for a writing instrument which is excellent in solvent resistance and moisture-absorption resistance has been increasingly desired.

In the case of a reservoir in which are provided an adhesive layer for sticking together the layers of an olefin base resin used for preventing an influence exerted from the outside as is the case with a laminate reservoir represented by a bottle for mayonnaise and an amide base resin having properties which are completely different from those of the olefin base resin, the solvent described above which is held in a linear olefin resin exerts an effect on absorption of moisture to a large extent under a humid condition, and therefore problems reside in that the amide base resin layer is swollen by moisture and that the amide base resin layer is deteriorated as the solvent permeates. Further, a problem resides in that if an adhesive layer for tightly adhering the resin layers of different kinds is present, moisture and a solvent are accumulated in a part thereof because of its affinity with both layers so that the part is swollen or lost transparency.

In light of the conventional problems described above, the present invention intends to solve them, and an object thereof is to provide an ink reservoir for a writing instrument which is sufficiently satisfactory for permeability of a solvent and absorption of moisture even under a wide variety of the environment and which is excellent in a storing property of the ink with the passage of time.

DISCLOSURE OF THE INVENTION

Intensive researches repeated by the present inventor on the problems of the conventional art described above have resulted in finding that an ink reservoir for a writing instrument which meets the object described above can be obtained by making the structure of the ink reservoir in which an ink containing various solvents is stored into a specific structure, and thus the present invention has come to be completed.

That is, the present invention comprises the following items (1) to (7).

(1) An ink reservoir for a writing instrument equipped with an ink reservoir in which an ink for a writing instrument is stored and a ballpoint pen type tip mounted at a point of the ink reservoir, wherein the ink reservoir comprises a laminated structure which is formed by extrusion molding of two or more kinds of thermoplastic resins and which does not have an adhesive layer, and a cyclic olefin or a thermoplastic resin compounded with an inorganic filler is laminated as the second layer or a subsequent layer.

(2) The ink reservoir for a writing instrument as described in the above item (1), wherein the ink for a writing instrument comprises at least one solvent selected from the group consisting of alcohols having 4 or more carbon atoms in a molecule, polyhydric alcohols and glycol monoethers.

(3) The ink reservoir for a writing instrument as described in the above item (1) or (2), wherein said thermoplastic resin is an olefin base resin.

(4) The ink reservoir for a writing instrument as described in any of the above items (1) to (3), wherein said thermoplastic resin is an olefin base resin having visibility.

(5) The ink reservoir for a writing instrument as described in any of the above items (1) to (4), wherein an ink follower for preventing the solvent for the ink for a writing instrument from volatilizing and moisture from being absorbed is provided at a rear end part of said ink reservoir for a writing instrument.

(6) The ink reservoir for a writing instrument as described in any of the above items (1) to (5), wherein the ink reservoir for a writing instrument has a wall thickness (L) of 0.05 to 2.0 mm.

(7) The ink reservoir for a writing instrument as described in any of the above items (1) to (6), wherein the ink reservoir for a writing instrument has a light transmittance of 80% or more.

BRIEF DESCRIPTION OF THE DRAWINGS

FIG. 1(a) is a vertical cross-sectional drawing showing one example in which the ink reservoir for a writing instrument of the present invention is applied to an ink reservoir for a ballpoint pen, and (b) is a partial cross section showing an essential part thereof.

BEST MODE FOR CARRYING OUT THE INVENTION

The modes for carrying out the present invention shall be explained below in details.

The ink reservoir for a writing instrument of the present invention is an ink reservoir for a writing instrument equipped with an ink reservoir in which an ink for a writing instrument is stored and a ballpoint pen type tip mounted at a point of the ink reservoir, wherein the ink reservoir comprises a laminated structure which is formed by extrusion molding of two or more kinds of thermoplastic resins and which does not have an adhesive layer, and a cyclic olefin or a thermoplastic resin compounded with an inorganic filler is laminated as the second layer or a subsequent layer.

The ink reservoir for a writing instrument in the present invention has to comprise a laminated structure which is formed by extrusion molding of two or more kinds of thermoplastic resins, that is, two or more kinds of thermoplastic resins having different characteristics and which does not have an adhesive layer, and has to be laminated a cyclic olefin or a thermoplastic resin compounded with an inorganic filler as the second layer or a subsequent layer.

The thermoplastic resins used for the ink reservoir for a writing instrument comprising the laminated structure formed by extrusion molding shall not specifically be restricted as long as the effects of the present invention can be exhibited, and preferred are, for example, resins comprising thermoplastic resins such as polypropylene (PP), polyethylene (PE), cyclic polyolefins, polymethylpentene, polyethylene terephthalate (PET), polybutylene terephthalate (PBT), polystyrene (PS), polycarbonate (PC), acrylonitrile-butadiene-styrene copolymers (ABS), nylon resins (polyamide), polyethyleneimide (PEI), polyphenylene sulfide (PPS), polysulfone (PSU), aliphatic polyketone, polyether sulfone (PES), polyarylate (PAR), polyphenylene ether (PPE), silicone elastomers, olefin base elastomers, polyvinyl chloride and polyvinylidene chloride, preferably olefin base thermoplastic resins selected from the group consisting of polypropylene (PP), polyethylene (PE), olefin base elastomers, cyclic polyolefins and polymethylpentene from the viewpoints of solvent resistance, moldability, environmental protection, transparency and economical efficiency and particularly preferably olefin base thermoplastic resins comprising a transparent member or a translucent member having an excellent moisture-permeation resistance and visibility.

In particular, preferably used for an innermost layer (first layer) is a linear olefin base resin such as polypropylene and polyethylene which is not influenced by an ink follower described later which is preferably filled on an ink rear end part in order to prevent vaporization of the solvent contained in the ink stored in the ink reservoir for a writing instrument of the present invention and absorption of moisture into the ink. The second layer and the like other than the first layer are preferably constituted of olefin base thermoplastic resins of a different series.

The olefin base thermoplastic resins of a different series include, for example, linear olefin base resins compounded with an inorganic filler, polymethylpentene and cyclic polyolefins.

In particular, a cyclic olefin base resin is preferred from the viewpoint of inhibiting absorption of moisture into the ink solvent. The above cyclic olefin base resin includes, for example, a cyclic olefin copolymer in which the performances of a polyolefin resin having excellent visibility (light transmittance: 90% or more) and an amorphous resin are combined, to be specific, an APL (Apel) series (APL 6509T, APL 6013T, APL 6011T, APL 6015T, APL 8008F, APL 8009T and APL 5014DP, all manufactured by Mitsui Chemicals Inc.) and cyclic olefin resins which are a kind of amorphous resins comprising cyclopentadiene in a C5 fraction as a principal raw material and which are excellent in visibility (light transmittance: 90% or more), to be specific, Zeonex and Zeonor (manufactured by Zeon Corporation).

The inorganic filler used for the linear olefin base resins described above compounded with the inorganic filler includes, for example, flaky mica, fine particles of titanium oxide, fine particles of silica and calcium carbonate.

The above inorganic fillers have an average article diameter of preferably 0.5 to 50 µm, more preferably 0.5 to 30 µm in terms of improvement in dispersibility and steric hindrance to a permeated substance. The resin layer filled with the inorganic filler is reduced in a transparency in a certain case depending on a thickness and a filling amount thereof, and therefore an attention has to be sufficiently paid to a balance between the performances. The inorganic filler is preferably blended with the resin in an amount of 0.01 to 20% by weight.

An adhesion between the layers formed from the above resins can be effectuated only by affinity of the thermoplastic resins such as the olefin base resins given above without using an adhesive layer having a purpose of adhesion. In the case of, for example, a thermoplastic resin A and a thermoplastic resin B, an interface is formed between the resins, but they can be brought into contact by affinity comprising principally van der Waals force. Further, in the case of the thermoplastic resin A and the thermoplastic resin A+an inorganic filler, an interface is molten since the same resins are extruded, and a layer of the inorganic filler results in being oriented.

The interface is preferably not present if possible. If an adhesive layer is present under a humid condition, the solvent used in the present invention and moisture coming in from the outside result in deteriorating the interface and allowing transparency of the resin to be lost, and a phenomenon of white turbidity is caused. Further, interposition of an adhesive layer between the resins is disadvantageous in terms of a cost.

In the present invention, the laminated structure which is formed by extrusion molding of two or more kinds of thermoplastic resins and which does not have an adhesive layer includes a two-layer structure, a three-layer structure, a four-layer structure and a five-layer structure, and it includes, for example, (1) a two-layer structure comprising thermoplastic resins each having different characteristics for an inner layer and an outer layer, (2) a three-layer structure comprising a thermoplastic resin for an inner layer, a thermoplastic resin having a different characteristic from that of the thermoplastic resin of the inner layer for an intermediate layer and the thermoplastic resin having the same characteristic as that of the thermoplastic resin of the inner layer for an outer layer or a thermoplastic resin having a different characteristic from those of the thermoplastic resins of the inner layer and the intermediate layer for an outer layer and (3) a four-layer structure comprising a first layer (inner layer) to a fourth layer (outermost layer), in which the adjacent layers comprise thermoplastic resin each having different characteristics.

The laminated structure comprising the cyclic olefin resin or the linear olefin base resin each having the characteristics described above compounded with an inorganic filler is preferred in order to further exhibit the effects of the present invention, and the above layer is preferably provided for the outermost layer in the case of a two-layer structure, an intermediate layer in the case of a three-layer structure and at least one layer between the outermost layer and the innermost layer or for the outermost layer in the case of a four or more layer structure.

In the second invention, the thicknesses (L1, L2, L3 - - -) of the respective resin layers and the total thickness (L) obtained by summing up the thicknesses of the above resin layers in the laminated structure which is formed by extrusion molding of two or more kinds of the thermoplastic resins and which does not have an adhesive layer vary depending on the kind of the ink stored and the kind of the thermoplastic resins used. It is preferred to set the total thickness (L) described above to 0.05 to 2.0 mm and the thicknesses (L1, L2, L3 - - -) of the respective resin layers described above to 0.05 to 1.8 mm from the viewpoints of strength, solvent-permeation resistance, moisture-absorption resistance, moldability, a transparency and a designing property. Further, the whole part of the ink reservoir for a writing instrument has preferably a light transmittance of 80% or more by selecting and using various thermoplastic resins having visibility of a light transmittance of preferably 80% or more, more preferably 90% or more as the thermoplastic resins for the respective layers.

The principal solvent for the ink for a writing instrument stored in the ink reservoir for a writing instrument of the present invention shall not specifically be restricted as long as it is a water soluble solvent used for a water base ink and an organic solvent used for an oil base ink. In particular, it includes at least one solvent selected from the group consisting of alcohols having 4 or more carbon atoms in a molecule, polyhydric alcohols and glycol monoethers from the viewpoint of further exhibiting an effect.

The alcohols which can specifically be used are aliphatic alcohols having 4 or more carbon atoms and include n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, trimethylnonyl alcohol, tetradecanol, heptadecanol, cyclohexanol, 2-methylcyclohexanol, benzyl alcohol and other various higher alcohols.

Also, the polyhydric alcohols include, for example, polyhydric alcohols having two or more carbon atoms and two or more hydroxyl groups in a molecule, such as diethylene glycol, 3-methyl-1, 3-butanediol, triethylene glycol, dipropylene glycol, 1,3-butanediol, 1,5-pentanediol, hexylene glycol and octylene glycol.

Further, the glycol monoethers include, for example, butyl ether, hexyl ether, 2-ethylhexyl ether, ethylene glycol monohexyl ether, ethylene glycol monophenyl ether, ethylene glycol mono-2-ethylbutyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

Among the solvents described above, the solvents other than the ethylene glycol derivatives are particularly preferably used from the viewpoints of safety and oral toxicity.

A content of the above solvents is 20 to 80% by weight based on the total ink amount.

The ink composition for a writing instrument stored in the ink reservoir for a writing instrument of the present invention contains, in addition to the principal solvent described above, a colorant such as a pigment (including a resin pigment) and a dye, a resin, a thickener and optional components contained in an ink for a writing instrument depending on the uses of the ink (a water-base ink, an oil-base ink and the like) for a writing instrument.

The optional components contained in the ink for a writing instrument includes, for example, a rust preventive, a fungicide, a surfactant, a lubricant and a wetting agent which do not exert an adverse effect on the ink and can be compatible therewith. In particular, a fatty acid can suitably be used as a lubricant. Further, a non-volatile solvent which is compatible with the principal solvent can be contained as an additive for inhibiting drying as long as it does not exert an adverse on the characteristics of the product.

The ink reservoir for a writing instrument in the present invention is applied to various writing instruments such as a ballpoint pen, a felt-tip pen, a brush pen and a free ink type writing instrument.

When the ink reservoir for a writing instrument of the present invention is applied to a ballpoint pen, an ink follower is preferably installed at a rear end part of the ballpoint pen ink reservoir (refill) in order to prevent the ink from volatilizing, moisture from being absorbed and the ink from leaking.

The ink follower used has to have low permeability and low diffusivity against the solvent used for the ink, and capable of being used as a base therefor is a non-volatile or scarcely volatile fluid substance, to be specific, non-silicone base fats and oils which are not basically compatible with the solvent having the characteristics described above used in the present invention, such as polybutene and liquid paraffin.

When the above substances have a low viscosity, a thickener and a gelatinizing agent are preferably used. To be specific, they include metallic soaps, bentonites, fatty acid amides, hydrogenated castor oils, metal fine particles including titanium oxide, silica and alumina, celluloses and elastomers.

Figure 1:
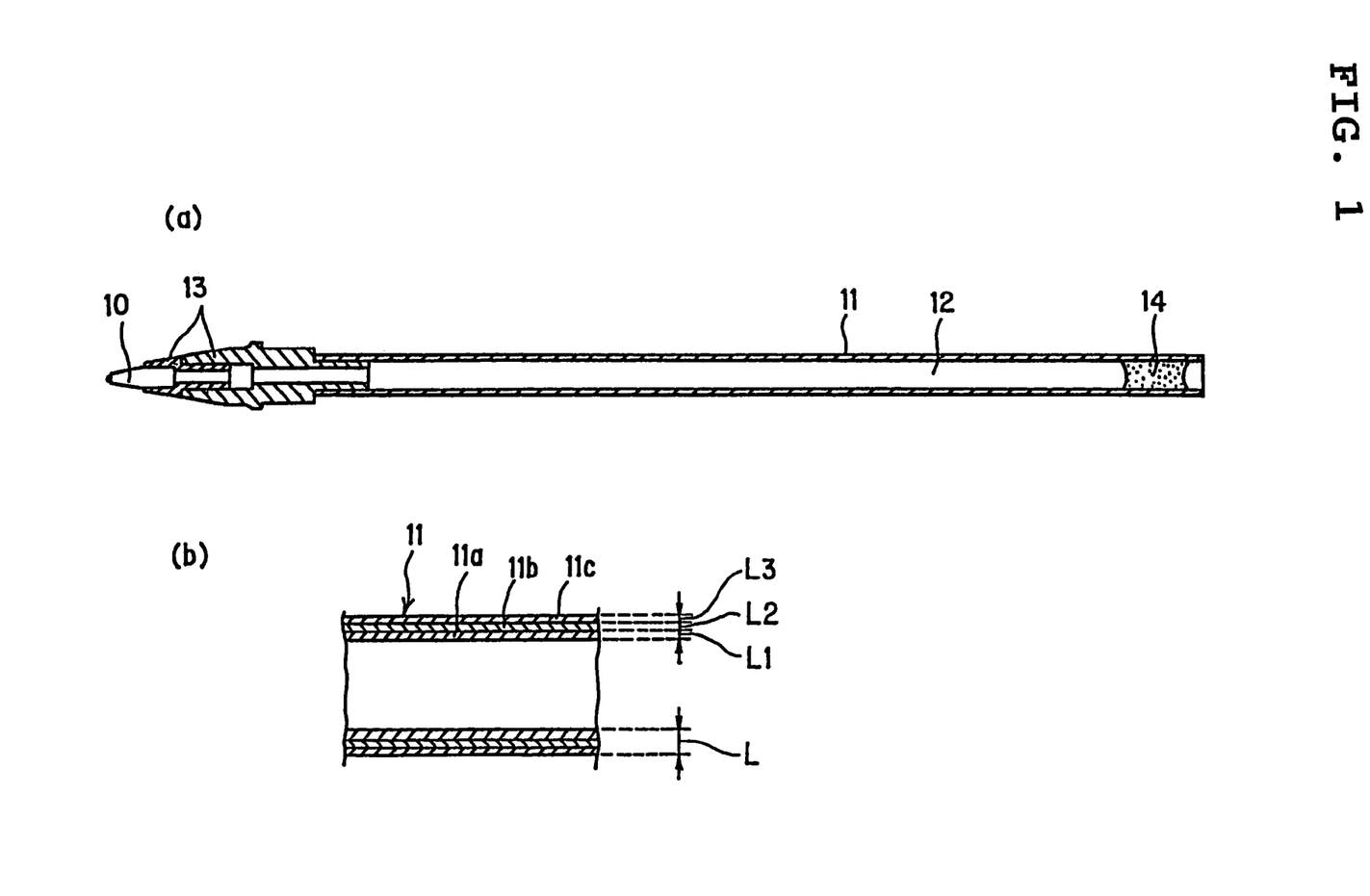
Figure 2:
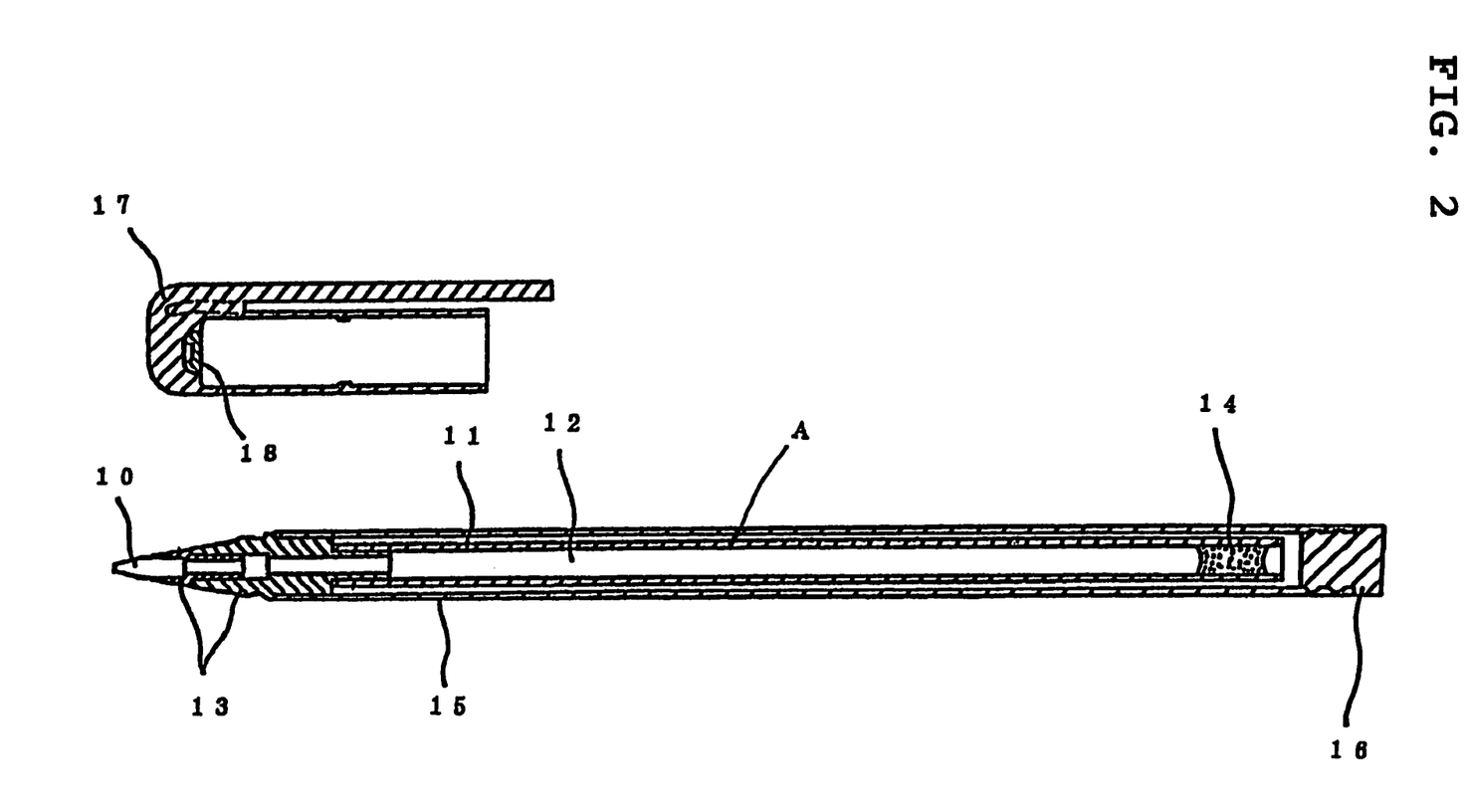
FIG. 2 is a vertical cross-sectional drawing of a ballpoint pen equipped with the ink reservoir for a ballpoint pen shown in FIG. 1.
Figure 3:
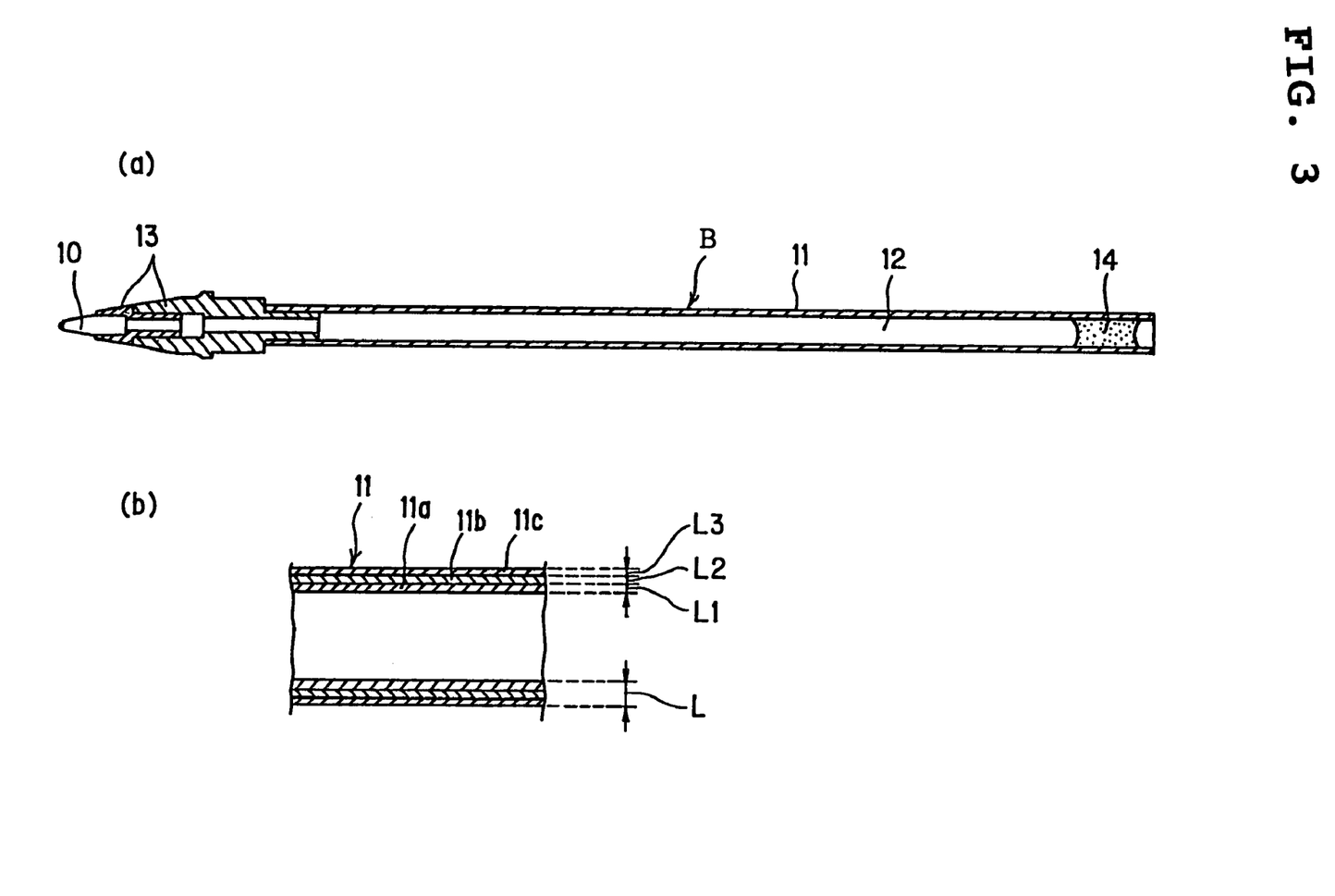

Next, the specific embodiments of the ink reservoirs for a writing instrument of the present invention shall be explained in further details with reference to FIG. 1 to FIG. 2.

FIGS. 1(a) and (b) and FIG. 2 are cases in which the ink reservoir for a writing instrument of the present invention is applied to an ink reservoir (refill) for a ballpoint pen.

The ink reservoir A for a writing instrument of the present embodiment has an ink reservoir 11 equipped with a ballpoint pen type tip 10 at a point, wherein 12 is an ink for a ballpoint pen containing the solvent having the characteristics described above which is filled into the ink reservoir; 13 is a joint member between the pen tip part and the ink reservoir; and 14 is an ink follower.

The above ink reservoir 11 is molded by coextrusion molding and constituted of the thermoplastic resins described above as shown in FIG. 1(*b*), and in the present embodiment, it is constituted of an inner layer 11*a* and an outermost layer 11*c* (each thickness (L1,L3): 0.2 mm) each comprising PP and an intermediate layer 11*b* (thickness (L2): 0.6 mm) comprising a cyclic olefin resin interposed between the inner layer part 11*a* and the outer layer 11*c*.

The above ink reservoir A for a writing instrument is installed, as shown in FIG. 2, in a barrel 15 for a ballpoint pen and used as a ballpoint pen, wherein 16 is a plug; 17 is a cap member; and 18 is a sealing rubber.

Estimated as follows is a reason why the ink reservoir for a writing instrument of the present invention thus constituted is excellent in a storing property of an ink with the passage of time even under a wide variety of the environment.

A reason why the above effect is exhibited includes an effect exerted to a large extent by an interaction between the ink solvent used and the molding resin. For example, when an organic solvent having a strong hygroscopic property selected from the group consisting of alcohols having 4 or more carbon atoms in a molecule, polyhydric alcohols and glycol monoethers is used as the principal solvent, it has an action to plasticize the material of the ink reservoir. In this case, moisture permeates heavily from the outside of the reservoir under a high temperature and high humidity condition. Accordingly, a material having less affinity with the above solvents has to be selected, and as a result, it has become clear that a thermoplastic resin, preferably an olefin base resin which is not linear is desirable. Further, the above resin has to have durability against a base oil used for an ink follower used for preventing the ink from volatilizing. Accordingly, the inner layer is preferably protected by a thermoplastic resin having durability against the base oil used for the ink follower, preferably a linear olefin base resin. Then, the second layer and other layers are laminated by thermoplastic resins having different characteristics from that of the inner layer, preferably cyclic olefin resins or resins compounded with an inorganic filler, whereby the ink reservoir (tube) which inhibits the ink solvent from absorbing moisture and which has durability against the ink follower can be prepared. The above thermoplastic resins comprising the olefin base resins have transparency. Accordingly, when a laminated structure is formed from it by extrusion molding, transparency thereof is not lost, and the deficiency that the ink remaining amount can not be observed is not caused. Because of the above matters, the ink reservoir structure of the present invention thus constituted makes it possible to provide the ink reservoir for a writing instrument which has satisfactory permeation resistance and moisture-absorption resistance against permeability of the solvent and a hygroscopic property of moisture even under a wide variety of the environment and which is excellent in a storing property of the ink with the passage of time.

EXAMPLES

Next, the present invention shall more specifically be explained with reference to examples and comparative examples, but the present invention shall not be restricted to the examples described below.

Examples 1 to 8 and Comparative Examples 1 to 20

(1) Inks for evaluation (four kinds), C-1 to C-4, having the following blend compositions used in the respective examples and comparative examples were prepared, and ink reservoirs (seven kinds), D-1 to D-7 were prepared. They were extrusion-molded by the following method.

| Ink for evaluation: C-1: | |
|---|---|
| Colorant: Spilon Black GMH Special (manufactured by Hodogaya Chemical Co., Ltd.) | 5% |
| Colorant: Valifast Violet #1702 (manufactured by Orient Chemical Ind. Ltd.) | 23% |
| Resin: Polyvinylbutyral BM-1 (manufactured by Sekisui Chemical Co., Ltd.) | 4% |
| Resin: YP 90L (manufactured by Yasuhara Chemical Co., Ltd.) | 8% |
| Solvent: | |
| 3-methoxy butanol | 35% |
| 3-methoxy-3-methyl-1-butanol | 25% |
| Ink for evaluation: C-2: | |
| Colorant: Valifast Violet #1702 (manufactured by Orient Chemical Ind. Ltd.) | 26% |
| Resin: | |
| Polyvinylbutyral BM-1 (manufactured by Sekisui Chemical Co., Ltd.) | 4% |
| Hilac 110H (manufactured by Hitachi Chemical Co., Ltd.) | 10% |
| Solvent: hexylene glycol | 10% |
| Solvent: 3-methoxy-3-methyl-1-butanol | 50% |
| Ink for evaluation: C-3: | |
| Colorant: Spilon Yellow C-GNH (manufactured by Hodogaya Chemical Co., Ltd.) | 20% |
| Resin: Polyvinylbutyral BM-S (manufactured by Sekisui Chemical Co., Ltd.) | 8% |
| Resin: Hilac 110H (manufactured by Hitachi Chemical Co., Ltd.) | 12% |
| Solvent: ethanol | 60% |
| Ink for evaluation: C-4: | |
| Colorant: Spilon Yellow C-GNH | 10% |
| Resin: Beccasite 1111 (manufactured by Hitachi Chemical Co., Ltd.) | 30% |
| Solvent: dipropylene glycol dimethyl ether | 60% |

Preparation of Ink Reservoir:

The respective thermoplastic resins described in the following D-1 to D-7 were used and extrusion-molded into a cylindrical form having an inner diameter of 4.0 mm and a thickness of 1.0 mm by means of an extrusion molding machine (multilayer extrusion die, 2 kinds 2 layers, 3 kinds 3 layers, 5 kinds 5 layers and the like), and they were cut to a length of 100 mm to prepare ink reservoirs having a cylindrical laminated structure or single layer structure.

D-1: first layer (inner layer)/second layer (intermediate layer)/third layer (outer layer)=polypropylene (0.3 mm)/polypropylene filled with 1% by weight of flaky mica having an average particle diameter of 2 to 5 μm (0.3 mm)/polypropylene (0.4 mm)

D-2: first layer (inner layer)/second layer (outer layer)=polypropylene (0.4 mm)/cyclic olefin resin (APL 8008T, manufactured by Mitsui Chemicals Inc., 0.6 mm)

D-3: first layer (inner layer)/second layer (intermediate layer)/third layer (outer layer)=polypropylene (0.3 mm)/polypropylene filled with 1% by weight of fine particles of titanium oxide having an average particle diameter of 0.5 to 2 μm (0.3 mm)/polypropylene (0.4 mm)

D-4: first layer (inner layer)/second layer (intermediate layer)/third layer (outer layer)=polyethylene (0.2 mm)/cyclic olefin resin (APL 8009T, manufactured by Mitsui Chemicals Inc., Ltd., 0.6 mm)/polyethylene (0.2 mm)

D-5: polypropylene

D-6: ABS resin

D-7: first layer (inner layer)/second layer/third layer/fourth layer/fifth layer (outermost layer)=polypropylene (0.2 mm)/adhesive layer (maleic anhydride-modified polyolefin, 0.2 mm)/nylon (Novamid 1020, manufactured by Mitsubishi Chemicals Corporation, 0.2 mm)/adhesive layer (maleic anhydride-modified polyolefin, 0.2 mm)/polypropylene (0.2 mm)

(2) Preparation of Ink Reservoirs for a Ballpoint Pen

The tips of a ballpoint pen having a ball diameter of 1.0 mm were mounted at the points of the respective ink reservoirs obtained in the manners described above via a metal (brass)-made joint member, and the inks for evaluation (four kinds), C-1 to C-4, were filled thereinto in a prescribed amount (1.0 g). The combinations of the inks for evaluation described above and the respective ink reservoirs corresponding to the examples and the comparative examples are shown in the following Table 1 to Table 3.

Then, a prescribed amount (0.15 g) of an ink follower having the following composition was filled thereinto from a rear end part of the respective ink reservoirs filled with the respective inks for evaluation to prepare ink reservoir samples for a ballpoint pen using an oil-base ink.

Blend Composition of the Ink Follower:

Diana Process Oil PW-380 (manufactured by Idemitsu Kosan Co., Ltd.) was used in an amount of 100% by weight. The pen bodies were left standing still with the pen tips turned downward so that the ink follower did not leak.

The respective ink reservoir samples for a ballpoint pen using an oil-base ink filled with the respective solvents for evaluation obtained in the respective examples and comparative examples described above were used to evaluate a moisture-absorption rate, a permeability and a change in the reservoir by the respective methods described above.

The evaluation results thereof are shown in the following Table 1 to Table 3.

Evaluation Methods:

The ink reservoir was left standing for 2 weeks under the environment of a temperature of 50° C. and a humidity of 30% and 80% to measure and calculate a moisture-absorption rate and a permeability in the ink reservoir. Further, a change in the appearance was observed.

In measuring the moisture-absorption rate, a moisture content in the solvent for evaluation was measured by means of a Karl Fisher's aquameter (MKA-210 manufactured by Kyoto Electronics Manufacturing Co., Ltd.) to obtain the moisture content from a difference from that of a blank and a moisture-absorption rate was calculated from the moisture content.

In measuring the permeability, correction was made from a change in the solvent-filling amount and the moisture content described above to calculate it in terms of a solvent permeability.

Evaluation of a Moisture-Absorption Rate of the Ink Reservoir:

The degree of the moisture-absorption rate was evaluated according to the following evaluation criteria.

Evaluation Criteria:

⊚: moisture-absorption rate of 1.00% or less

○: moisture-absorption rate of exceeding 1.00% to less than 1.50%

Δ: moisture-absorption rate of 1.50 to less than 2.00%

X: moisture-absorption rate of 2.00% or more

Evaluation of a Permeability of the Ink Reservoir:

The degree of the permeability rate was evaluated according to the following evaluation criteria.

Evaluation Criteria:

⊚: permeability of 1.00% or less

○: permeability of exceeding 1.00% to less than 1.50%

Δ: permeability of 1.50 to less than 2.00%

X: permeability of 2.00% or more

Evaluation of a Change in the Ink Reservoir:

The ink reservoir was left standing for 2 weeks under the environment of a temperature of 50° C. and a humidity of 80% to visually evaluate deterioration according to the following evaluation criteria.

Evaluation Criteria:

○: no change in the appearance

Δ: cracking, white turbid state or deformation is observed in the appearance (small extent)

X: cracking, white turbid state or deformation is observed in the appearance (large extent)

TABLE 1

|  | Example | | | | | | | |
| --- | --- | --- | --- | --- | --- | --- | --- | --- |
|  | 1 | 2 | 3 | 4 | 5 | 6 | 7 | 8 |
| Kind of solvent for evaluation | C-1 | C-2 | C-1 | C-2 | C-1 | C-2 | C-1 | C-2 |
| Material of ink reservoir | D-1 | D-1 | D-2 | D-2 | D-3 | D-3 | D-4 | D-4 |
| Evaluation of moisture-absorption rate | | | | | | | | |
| 50° C., 30% | ⊚ | ⊚ | ⊚ | ⊚ | ⊚ | ⊚ | ⊚ | ⊚ |
| 50° C., 80% | ⊚ | ⊚ | ⊚ | ⊚ | ⊚ | ⊚ | ⊚ | ⊚ |
| Evaluation of permeability | | | | | | | | |
| 50° C., 30% | ⊚ | ⊚ | ⊚ | ⊚ | ⊚ | ⊚ | ⊚ | ⊚ |
| 50° C., 80% | ⊚ | ⊚ | ⊚ | ⊚ | ⊚ | ⊚ | ⊚ | ⊚ |
| Change in ink reservoir | ○ | ○ | ○ | ○ | ○ | ○ | ○ | ○ |

TABLE 2

| | Comparative Example | | | | | | | | | |
|---|---|---|---|---|---|---|---|---|---|---|
| | 1 | 2 | 3 | 4 | 5 | 6 | 7 | 8 | 9 | 10 |
| Kind of solvent for evaluation | C-1 | C-1 | C-1 | C-2 | C-2 | C-2 | C-3 | C-3 | C-3 | C-3 |
| Material of ink reservoir | D-5 | D-6 | D-7 | D-5 | D-6 | D-7 | D-1 | D-2 | D-3 | D-4 |
| Evaluation of moisture-absorption rate | | | | | | | | | | |
| 50° C., 30% | ⊙ | ⊙ | ⊙ | ⊙ | ⊙ | ⊙ | ⊙ | ⊙ | ⊙ | ⊙ |
| 50° C., 80% | X | X | X | X | X | X | X | X | X | X |
| Evaluation of permeabiity | | | | | | | | | | |
| 50° C., 30% | ⊙ | X | ⊙ | ⊙ | X | ⊙ | X | X | X | X |
| 50° C., 80% | X | X | X | X | X | X | X | X | X | X |
| Change in ink reservoir | ○ | X | X | ○ | X | X | ○ | ○ | ○ | ○ |

TABLE 3

| | Comparative Example | | | | | | | | | |
|---|---|---|---|---|---|---|---|---|---|---|
| | 11 | 12 | 13 | 14 | 15 | 16 | 17 | 18 | 19 | 20 |
| Kind of solvent for evaluation | C-3 | C-3 | C-3 | C-4 | C-4 | C-4 | C-4 | C-4 | C-4 | C-4 |
| Material of ink reservoir | D-5 | D-6 | D-7 | D-1 | D-2 | D-3 | D-4 | D-5 | D-6 | D-7 |
| Evaluation of moisture-absorption rate | | | | | | | | | | |
| 50° C., 30% | ⊙ | ⊙ | ⊙ | ⊙ | ⊙ | ⊙ | ⊙ | ⊙ | ⊙ | ⊙ |
| 50° C., 80% | X | X | X | X | X | X | X | X | X | X |
| Evaluation of permeability | | | | | | | | | | |
| 50° C., 30% | X | X | X | X | X | X | X | X | X | ○ |
| 50° C., 80% | X | X | X | X | X | X | X | X | X | ○ |
| Change in ink reservoir | ○ | Δ | Δ | ○ | ○ | ○ | ○ | ○ | X | Δ |

As apparent from the results shown in Table 1 to Table 3 described above, it has been found that the respective ink reservoirs having the combinations in Examples 1 to 8 falling in the scope of the present invention are excellent in moisture-absorption resistance and permeation resistance against the solvents as compared with the ink reservoirs having the combinations in Comparative Examples 1 to 20 falling outside the scope of the present invention. Further, it has become clear that in the respective ink reservoirs prepared in Examples 1 to 8 falling in the scope of the present invention, cracking, white turbid state or deformation is not observed in the appearance even after left standing for 2 weeks under the environment of a temperature of 50° C. and a humidity of 80% and that they are excellent as well in visibility.

INDUSTRIAL APPLICABILITY

According to the present invention, provided is an ink reservoir for a writing instrument which has satisfactory permeation resistance and moisture-absorption resistance against permeation of a solvent and absorption of moisture even under a wide variety of the environment and which is excellent in a storing property of the ink with the passage of time.

The invention claimed is:

1. An ink reservoir for a writing instrument equipped with an ink reservoir in which an ink for a writing instrument is stored and a ballpoint pen type tip mounted at a point of the ink reservoir, wherein the ink reservoir for a writing instrument comprises a laminated structure which is formed by extrusion molding of two or more kinds of thermoplastic resins and which does not have an adhesive layer, and a cyclic olefin resin or a thermoplastic resin compounded with an inorganic filler is laminated as second layer or a subsequent layer.

2. The ink reservoir for a writing instrument as described in claim 1, wherein the ink for a writing instrument comprises at least one solvent selected from the group consisting of alcohols having 4 or more carbon atoms in a molecule, polyhydric alcohols and glycol monoethers.

3. The ink reservoir for a writing instrument as described in claim 2, wherein said thermoplastic resin is an olefin base resin.

4. The ink reservoir for a writing instrument as described in claim 3, wherein said thermoplastic resin is an olefin base resin having visibility.

5. The ink reservoir for a writing instrument as described in claim 4, wherein an ink follower for preventing the solvent for the ink for a writing instrument from volatilizing and moisture from being absorbed is provided at a rear end part of said ink reservoir for a writing instrument.

6. The ink reservoir for a writing instrument as described in claim 5, wherein the ink reservoir for a writing instrument has a wall thickness of 0.05 to 2.0 mm.

7. The ink reservoir for a writing instrument as described in claim 6, wherein the ink reservoir for a writing instrument has a light transmittance of 80% or more.

8. The ink reservoir for a writing instrument as described in claim 1, wherein said the thermoplastic resin is an olefin base resin.

9. The ink reservoir for a writing instrument as described in claim 1, wherein said thermoplastic resin is an olefin base resin having visibility.

10. The ink reservoir for a writing instrument as described in claim 1, wherein an ink follower for preventing the solvent for the ink for a writing instrument from volatilizing and moisture from being absorbed is provided at a rear end part of said ink reservoir for a writing instrument.

11. The ink reservoir for a writing instrument as described in claim 1, wherein the ink reservoir for a writing instrument has a wall thickness 0.05 to 2.0 mm.

12. The ink reservoir for a writing instrument as described in claim 1, wherein the ink reservoir for a writing instrument has a light transmittance of 80% or more.

* * * * *

UNITED STATES PATENT AND TRADEMARK OFFICE
CERTIFICATE OF CORRECTION

PATENT NO. : 7,056,052 B2  Page 1 of 1
APPLICATION NO. : 10/513039
DATED : June 6, 2006
INVENTOR(S) : Shuji Ichikawa It is certified that error appears in the above-identified patent and that said Letters Patent is hereby corrected as shown below:

(75) Inventors:
    Delete Kazuhiko Furukawa, Yokohama (JP); and Takeshi Kobayashi, Yokohama (JP).

Column 12, line 66, Claim 8:
    after "said", delete "the".

Signed and Sealed this

Ninth Day of January, 2007

JON W. DUDAS
*Director of the United States Patent and Trademark Office*